United States Patent [19]

Lawassani et al.

[11] Patent Number: 5,331,525

[45] Date of Patent: Jul. 19, 1994

[54] LOW PROFILE SUN VISOR SYSTEM WITH REMOTE LIGHTING

[75] Inventors: Abdi R. Lawassani, Waterford; James D. Dowd, Farmington Hills; Monte L. Falcoff, Beverly Hills, all of Mich.

[73] Assignee: United Technologies Automotive, Inc., Dearborn, Mich.

[21] Appl. No.: 4,463

[22] Filed: Jan. 14, 1993

[51] Int. Cl.⁵ .................................. F21V 33/00
[52] U.S. Cl. .................................. 362/140; 296/97.5; 296/97.9; 296/214
[58] Field of Search ............ 296/97.2, 97.5, 97.9, 296/214; 362/135, 136, 137, 138, 139, 140, 141, 142, 143, 144

[56] References Cited

U.S. PATENT DOCUMENTS

| | | | |
|---|---|---|---|
| 2,634,161 | 4/1953 | Beets. | |
| 4,364,597 | 12/1982 | Viertel et al. | 296/97.5 |
| 4,681,363 | 7/1987 | Hemmeke et al. | 296/97 G |
| 4,690,450 | 9/1987 | Boerema et al. | 296/97.9 |
| 4,783,111 | 11/1988 | Hemmeke et al. | 296/97.8 |
| 4,888,072 | 12/1989 | Ohlenforst et al. | 296/97.9 |
| 4,902,068 | 2/1990 | Dowd et al. | 296/214 |
| 4,913,484 | 4/1990 | Dowd et al. | 296/97.12 |
| 4,921,300 | 5/1990 | Lawassani et al. | 296/97.11 |
| 4,958,878 | 9/1990 | Kempkens | 296/97.9 |
| 5,011,212 | 4/1991 | Viertel et al. | 296/97.9 |
| 5,011,218 | 4/1991 | Danner et al. | 296/97.9 |
| 5,039,153 | 8/1991 | Lindberg et al. | 296/97.5 |
| 5,082,323 | 1/1992 | Dowd et al. | 296/214 |
| 5,192,110 | 3/1993 | Mykytiuk et al. | 296/97.5 |

FOREIGN PATENT DOCUMENTS

1529412  5/1968  France ................ 296/97.5

*Primary Examiner*—Ira S. Lazarus
*Assistant Examiner*—Alan B. Cariaso
*Attorney, Agent, or Firm*—Harness, Dickey & Pierce

[57] ABSTRACT

The primary sun visor is co-existent with a low profile thin member, known as a recessed tray, which is independent from the headliner substrate and is thinner than the headliner substrate it replaces. The recessed tray contains an integrally molded center support and outboard bezel area. The primary sun visor vanity mirror lamps have been removed and integrated into the recessed tray. The recessed tray retains both the primary and auxiliary sun visors.

16 Claims, 5 Drawing Sheets

LOW PROFILE SUN VISOR SYSTEM WITH REMOTE LIGHTING

BACKGROUND OF THE INVENTION

This invention relates generally to sun visors for automotive vehicles and, more specifically, to a sun visor assembly with a thin packaging profile.

Automotive vehicle manufacturers place high importance on environmental issues such as fuel efficiency standards. In recent years auto makers have designed automobiles with aerodynamic exterior shapes which have a low coefficient of drag to achieve increased fuel efficiency and lower wind noise. These more aerodynamic designs often involve a lower vehicle roof. The front header panel, attached to the front edge of the roof metal, is accordingly moved downward and rearward. A lower vehicle roof, however, negatively impacts the styling and packaging of the interior components.

Traditionally, sun visors in automotive vehicles are positioned below an inner roof trim piece, known as the headliner, which covers the bottom of the front header as well as the roof sheet metal. The headliner usually consists of a compression molded fiberglass substrate which can be compressed below the front header. Located beneath the headliner cloth is often a secondary sun visor, known as an auxiliary sun visor, which is stowed against the headliner surface in its unused position and can be rotated from the headliner forward to the windshield and back again. The primary sun visor is, in turn, located below the auxiliary sun visor and can be rotated forward toward the windshield or can be rotated in an outward direction to block sunlight from entering the side window. Primary sun visors often contain illuminated vanity mirrors which are usually the thickest dimensional item on the sun visor. Thus, this entire sun visor assembly can become quite large from the front header to the bottom of the primary sun visor; this reduces the occupants' head room and may encroach upon their upward viewing through the windshield.

Furthermore, a rotatable elbow located at the outboard end of the primary sun visor is mounted to the sheet metal with screws or quick-connect type fasteners and currently the headliner is covered by a trim bezel known as an outboard bezel. The opposite end of the primary sun visor, closest to the center line of the vehicle, is often mounted to a center support through a releasable roller which holds the sun visor when stowed or rotated downward. When an auxiliary sun visor is part of the vehicle, it is mounted by a pivot means to both the outboard bezel and to the center support. The many part tolerances involved often create inconsistent center support efforts, and aesthetic gapping or interference problems may occur between all of these parts.

Another method consists of a cloth covered formed pressboard retainer with metal bracketry to retain preassembled primary sun visors and a center lamp. This assembly covered the front portion of the headliner and was screwed to the front header. Not only was this device quite heavy, thick and expensive, it neither retained an auxiliary sun visor nor used remote lighting. Moreover, significant tolerance and appearance benefits could not be realized with this assembly since very little part integration was present.

SUMMARY OF THE INVENTION

In accordance with the present invention, a primary sun visor is co-existent with a low profile member, known as a recessed tray, which is independent from the headliner substrate. The recessed tray contains an integrally molded center support and outboard bezel. Overall, the sun visor assembly with the recessed tray is a low profile package since the thick headliner substrate is replaced by the significantly thinner recessed tray thus increasing the occupants' head room.

The present invention has integrated vanity mirror lamps such that the lenses, bulbs, electrical circuitry and lamp housings have been removed from the primary sun visor blade and have been repositioned within the top side of the recessed tray. The present invention also retains both the primary sun visor and an auxiliary sun visor such that the auxiliary sun visor can rotate for and aft from pivot points connected directly to the recessed tray.

BRIEF DESCRIPTION OF THE DRAWINGS

FIG. 13 is a schematic diagram of an electrical circuit and electrical switch used in the preferred embodiment of the present invention.

DESCRIPTION OF THE PREFERRED EMBODIMENTS

Figure 1:
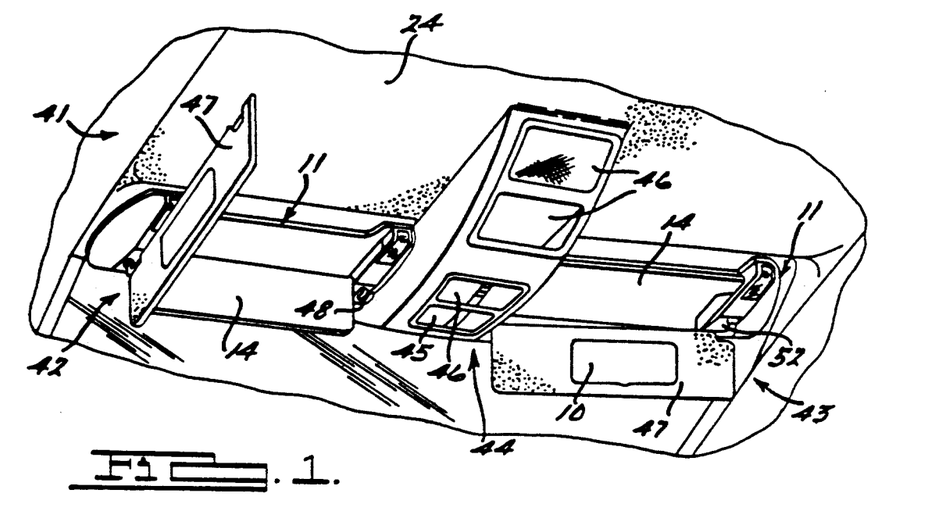
FIG. 1 is a perspective view of a preferred embodiment of a sun visor system of the present invention showing the relative position of the system and the headliner assembly.
Figure 2:
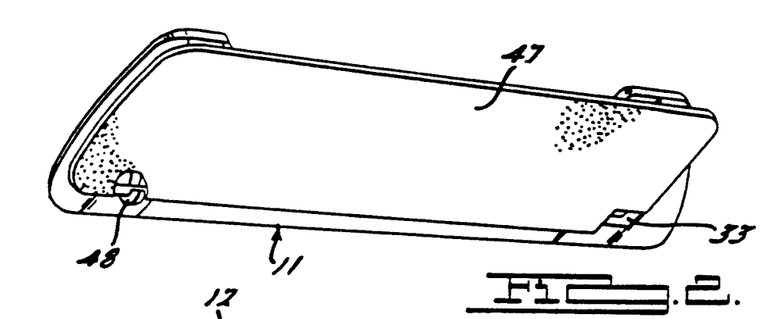
FIG. 2 is a perspective view of the embodiment of the present invention shown in FIG. 1, in a stowed position.

FIG. 1 illustrates a sun visor system of the present invention which is indicated generally by the numbers, 42 and 43. The foundation of this sun visor system is a low profile recessed tray 11, having a primary sun visor 47, an auxiliary sun visor 14, integral tray-mounted lamps 12, an integral center support 48 and an integrated outboard bezel area 52. FIG. 1 illustrates a headliner assembly 41 as viewed from the front left seat of the automobile. The sun visor systems, 42 and 43, of the present invention are located on either side of a center console 44 at the front portion of the headliner assembly 41. For reference purposes, the center console 44 may contain various lamps 45 and storage bins 46, or the center console 44 may not be present at all.

Figure 9:
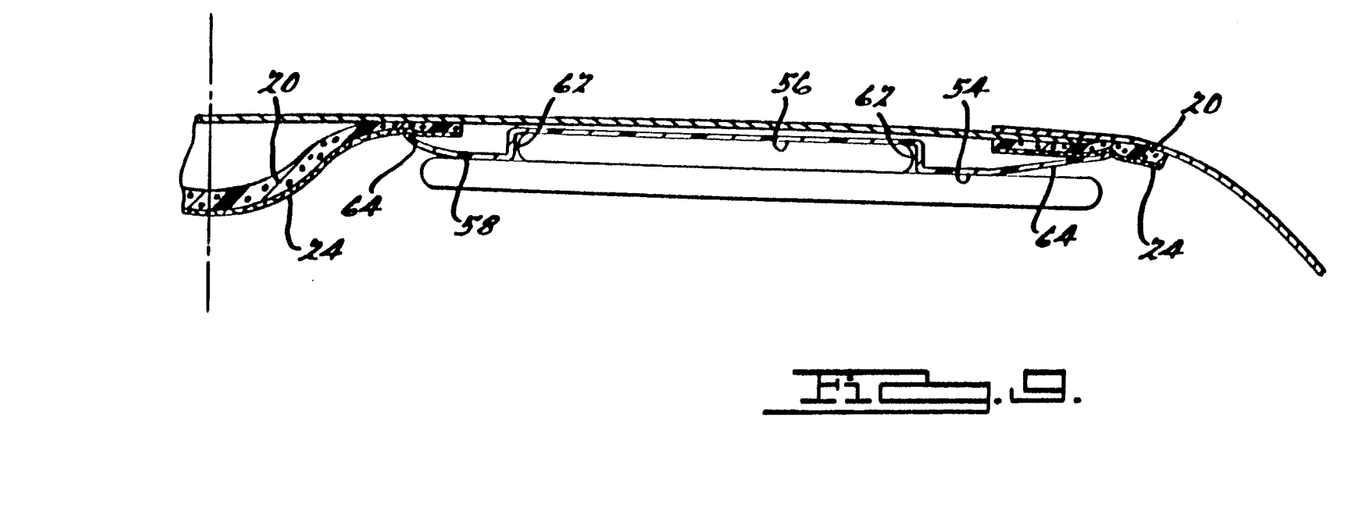
FIG. 9 is a rear sectional view of the embodiment of the present invention shown in FIG. 1, depicting the recessed tray in relation to the front header panel.

Referring to FIGS. 1-6, the low profile recessed tray 11, is located directly below the sheet metal front header 18. The compression molded fiberglass headliner substrate 20 with its foam backed cover material 24 is cut away in this area and is directly replaced by the recessed tray 11. The recessed tray 11 is both a functional and aesthetic member, the center portion of which is thinner in section than would be the conventional headliner substrate 20 and cover material 24. The recessed tray 11 is generally comprised of three substantially horizontal flat surfaces 54, 56 and 58, connected by generally vertical angled walls, 60 and 62. This can be seen in FIG. 9. The centrally located horizontal surface 56 is located closer to the front header 18 than are the two adjacent lateral horizontal surfaces, 54 and 58. The horizontal surfaces, 54, 56 and 58, are also bounded by overlapping surfaces 64 which cover the interface of the recessed tray 11 to the headliner cloth 24. It is envisioned that the recessed tray 11 would be injection molded from a polymeric material such as polycarbonate.

As can be observed in FIGS. 1-6, preferably, both the primary sun visor 47 and the auxiliary sun visor 14 are pre-assembled to the recessed tray 11. The primary sun visor 47 is an opaque member that can be pivoted between the headliner cover material 24 and the front window about its horizontal axis. It can also be rotated about a primary sun visor elbow 33 to block the sun at the side window. The primary sun visor often contains a vanity mirror unit 10 covered by a lid.

Figures 5, 11:
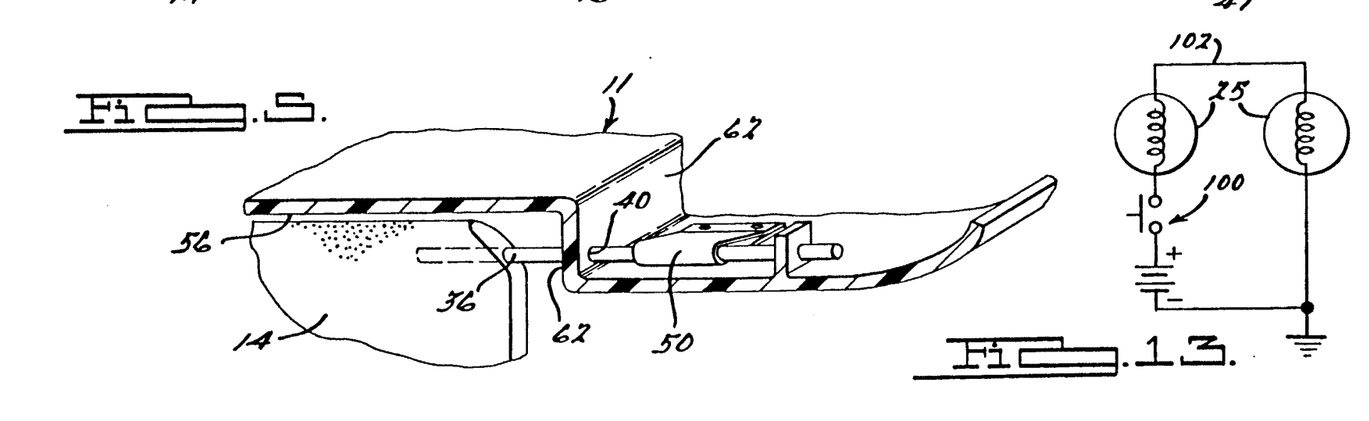
FIG. 5 is a enlarged sectional perspective view of the embodiment of the present invention taken from circle A in FIG. 4.
FIG. 11 is an enlarged bottom view of the embodiment of the present invention illustrating the keyhole area shown in FIG. 7 after preassembly.
Figure 7:
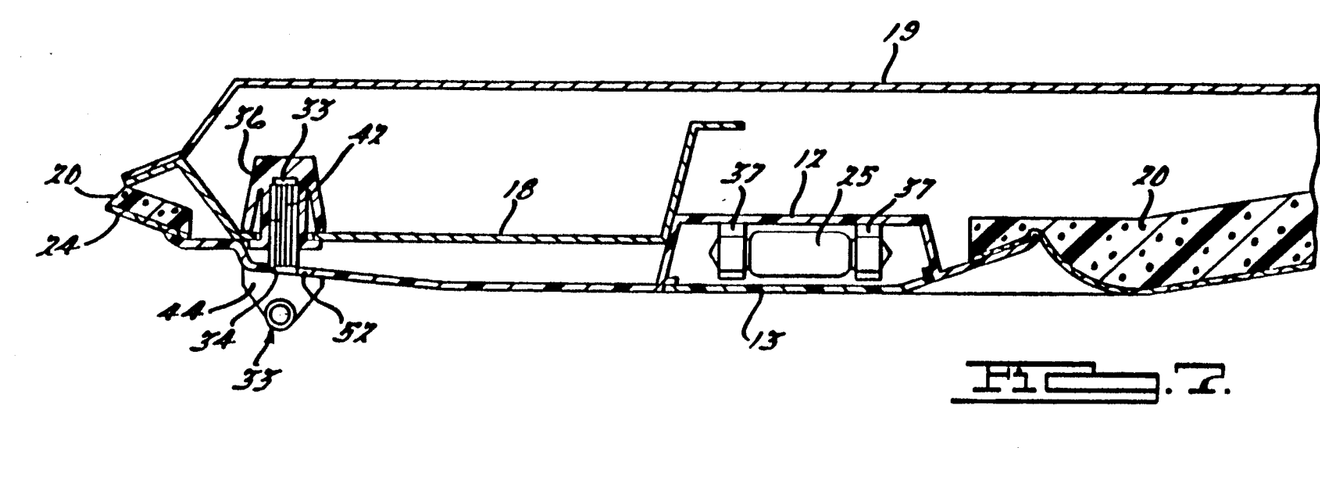
FIG. 7 is a sectional view of the embodiment of the present invention shown in FIG. 1, through the outboard lamp portion of the recessed tray and through the primary sun visor elbow and fastening means.
Figure 10:
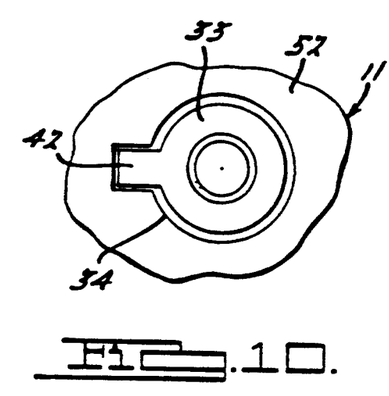
FIG. 10 is an enlarged bottom view of the embodiment of the present invention illustrating the keyhole area shown in FIG. 7 before preassembly.
Figure 11:
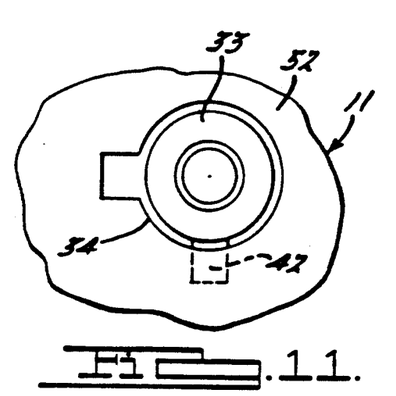

As is shown in FIG. 7, a primary sun visor elbow 33, about which the primary sun visor blade 47 rotates, protrudes upwards through a keyhole area 34 in the bottom side of the recessed tray 11 known as the outboard bezel area 52. The frictional rotation control for the primary sun visor elbow 33 is made by conventional means such as with a compression spring and crimped over tube or preferably with an insert molded polymeric section encapsulating the steel tube. Furthermore, a polymeric cover 44 is preferably insert molded upon the tube at the bend. The primary sun visor elbow 33 and, in turn, the recessed tray 11 can be retained to the front header 18 by use of a quick-connect fastening means 36 or by driving screws into the recessed tray 11. FIGS. 10 and 11 illustrate the means by which the primary sun visor elbow 33 retains the recessed tray 11. A flange 42 is formed along the insert molded shaft of the elbow 33 such that the diameter of the shaft and the flange 42 are designed to fit snugly through the keyhole 34 in the recessed tray 11. Once the flange 42 is pushed upwards through the keyhole 34, the elbow is rotated to its normally usable position as can be seen in FIG. 11. This prevents the sun visor from being unintentionally disengaged from the recessed tray 11 and the lower insert molded cover 44 serves to hold the recessed tray 11 against the front header 18. Furthermore, this design negates the need for a separate outboard bezel as has been traditionally used to retain the headliner cover material 24 and substrate 20 to the front header 18.

Figure 3:
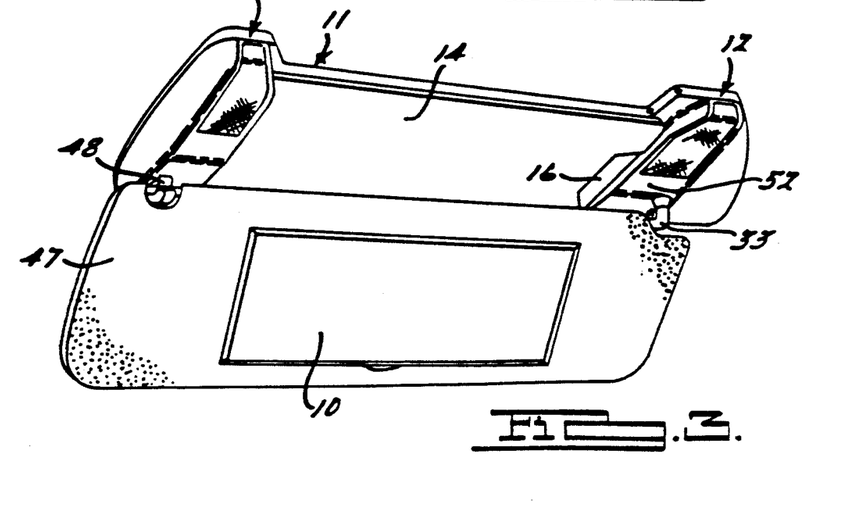
FIG. 3 is a perspective view of the embodiment of the present invention shown in FIG. 2, with the primary sun visor rotated downwards, with the auxiliary sun visor stowed in the recessed tray and with remote lamps integrated into the recessed tray.

As can best be seen in FIGS. 3 and 4, the auxiliary sun visor 14 is stowed below the tray's central horizontal surface 56 and positioned longitudinally between the lower horizontal surfaces, 54 and 58. The auxiliary sun visor 14 may also require an extender 16 which can be pulled out to block the sunlight entering at the A pillar area. This extender 16 must be returned to its sheathed position in order for the auxiliary sun visor 14 to be stowed. As can be observed in FIGS. 2-4, the primary sun visor 47 is then stowed directly below the auxiliary sun visor 14 and may be in direct contact with the lower inboard and outboard portions of the tray, respectively 54 and 58.

Figure 4:
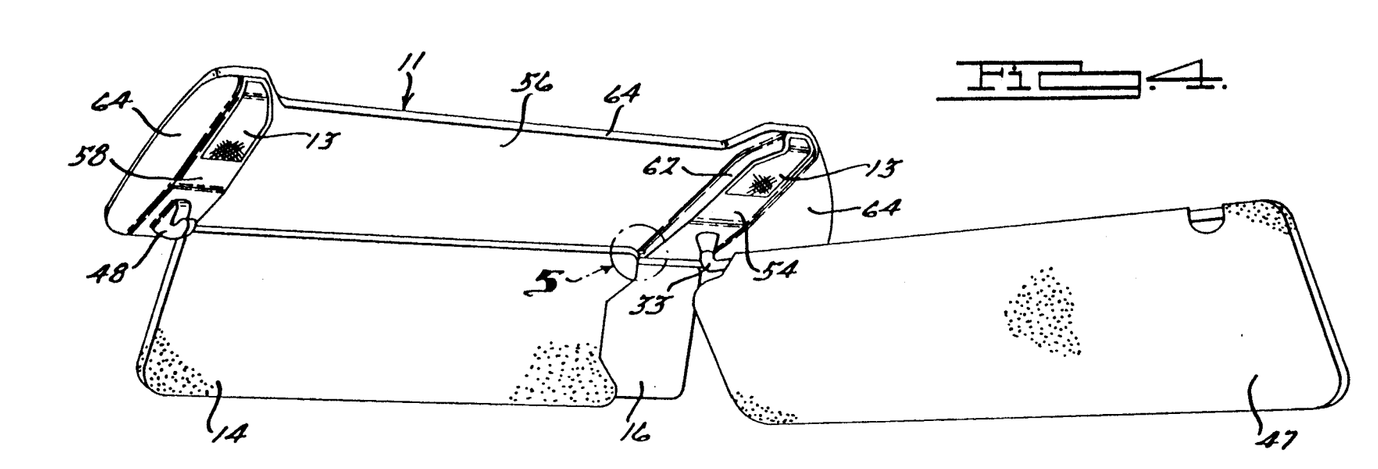
FIG. 4 is a perspective view of the embodiment of the present invention shown in FIG. 3, with the primary sun visor rotated toward the side window and with the auxiliary sun visor rotated toward the windshield.

Referring to FIGS. 4 and 5, the auxiliary sun visor 14 is attached to the recessed tray 11 through a pivot rod 36. The pivot rod 36 can either be insert molded onto the auxiliary sun visor 14 or press fit into a slot within the auxiliary sun visor 14 with a locked orientation fitting. The pivot rod 36 can rotate within a hole at location 40 molded in the vertical surface 62, of the recessed tray 11. Frictional or detent control of the auxiliary sun visor 14 can be maintained through a metal clip 15 which can be heat staked, riveted or otherwise fastened to the top side of the recessed tray 11. The design of such a metal clip would be known to one skilled in the art since these type of clips are commonly used on primary sun visors 47.

Within the present invention the lamps have been removed from the primary sun visor vanity mirror 10 and are remotely located onto the lower horizontal surfaces, 54 and 58, of the recessed tray 11. As can best be seen in FIGS. 7 and 8, a pair of bulb cavities 12 can be integrally formed into the recessed tray 11. The location of these bulb cavities 12 is rearward of the front header panel 18 and is located between the top surface of the recessed tray 11 and the roof sheet metal panel 19. Bulb terminals 37 and portions of an electrical circuit 102 (see FIG. 13) are attached to the recessed tray 11 through snap fits or heat staked bosses and serve to retain the bulb 25. The bulb terminals 37 are designed and made from conventional methods. The lower surface of a bulb cavity 12 and the recessed tray 11 serve to retain a lens 13 containing fresnels which direct the light toward an occupant's face. The remote location for the lamps serve three purposes: first, it provides for a more effective package behind the front header 18 due to the otherwise unused space between the headliner 20 and the roof panel 19; this, in turn, allows for a thinner primary sun visor package 47. Second, it gives a remote lighting perception such that when a vehicle occupant opens the vanity lid directly in front of his face, an electrical switch 100 (see FIG. 13) is closed and the bulbs will illuminate from overhead. Third, it allows for a lighter weight primary sun visor 47 which makes it easier to meet the durability requirements for the detent clip contained there within.

Figure 8:
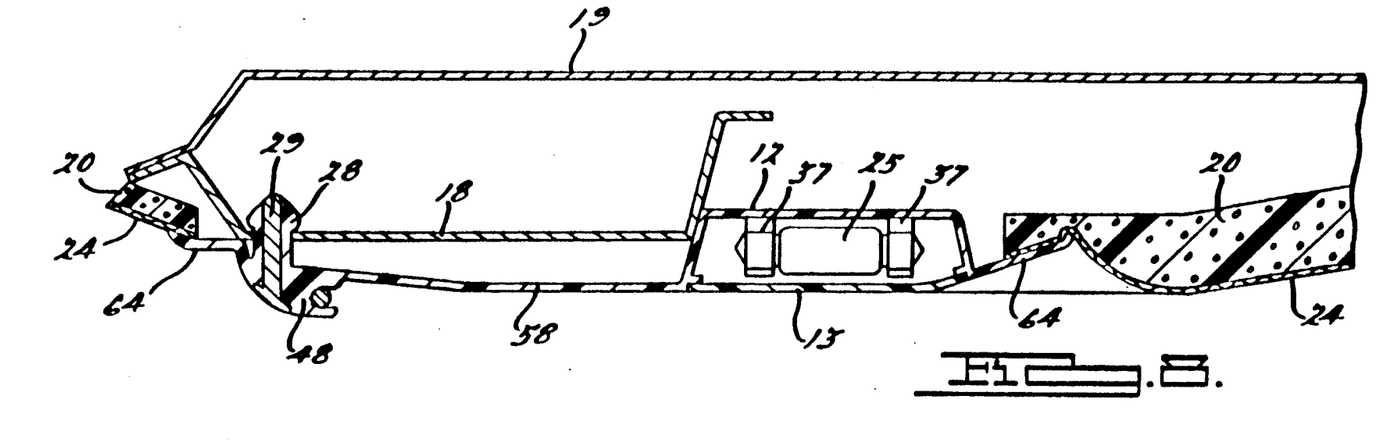
FIG. 8 is a sectional view of the embodiment of the present invention shown in FIG. 1, through the inboard lamp portion of the recessed tray and through the center support integrated into the recessed tray.

A further advantage of the present invention is that the center support 48 can be integrated into the recessed tray 11. The center support 48 serves to temporarily retain the inboard side of the primary sun visor 47. This is illustrated in FIG. 8. The integral center support 48 can be fastened to the front header 18 through conventional methods such as by using snap legs 28 and a mandrel 29 or merely by screwing the center support 48 directly into the sheet metal front header 18.

Figure 6:
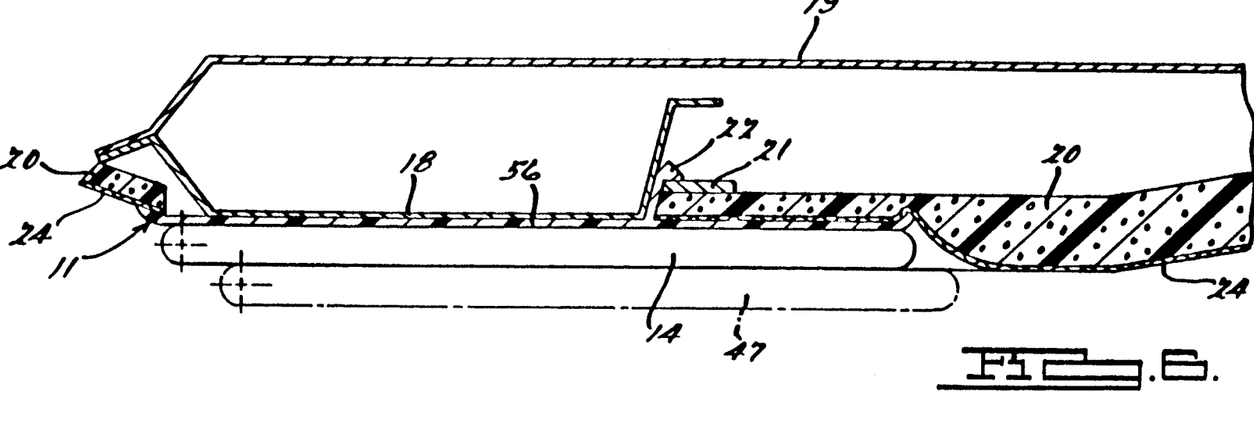
FIG. 6 is a sectional view through the center of the embodiment of the present invention shown in FIG. 1, demonstrating the relative location of the primary and auxiliary sun visors to the recessed tray and to the front header.

Referring to FIG. 6, when the present invention is part of a modular headliner, the recessed tray 11 is retained to the headliner substrate 20 through use of integrally molded snap fits 22 and a separate retainer 21. The retainer 21 is preferably manufactured from a polymeric material such as ABS or could alternatively be produced from a die-cut pressboard material. This retention system is useful if the sun visor assemblies, 42 and 43, are preassembled to the headliner substrate 20 for use as a modular one-piece headliner.

Figure 12:
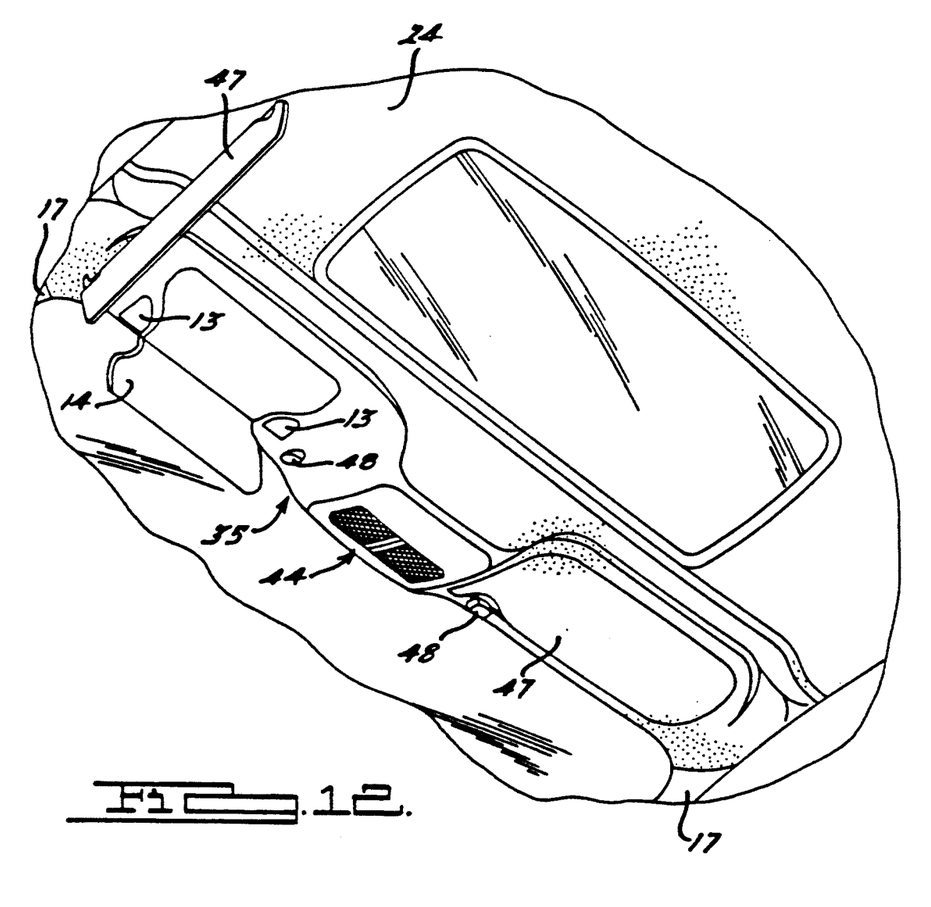
FIG. 12 is a perspective view of the embodiment of the present invention showing an alternative embodiment.

Referring to FIG. 12, an alternative embodiment of the present invention is shown. A thin member 35 replaces the headliner substrate 20 and cover material 24 at the front of the vehicle and stretches from one A-pillar 17 to the other. This thin member 35 is used not only to retain the primary and auxiliary sun visors, respectively 47 and 14, but also holds the remote lamps 13, center supports 48 and front console 44. The construction and advantages of the prior embodiment are also present in this one. This alternative approach is much more suitable to sunroof vehicles due to the otherwise weak headliner substrate 20 caused by the center cutout.

It will be appreciated that the sun visor system of the present invention represents a significant improvement because of the added occupant head room availability. This system is substantially thinner than that traditionally used due to the remote location of the vanity lamps and due to the replacement of the traditional headliner substrate with a much thinner member.

Moreover, by integrating the primary sun visor, the auxiliary sun visor and the remote lamp features, plus the center support and outboard bezel, further assembly benefits can be accrued. First, the number of parts to be installed into the vehicle can be reduced thereby allowing the assembly plant workers to only install one part per side, the entire low profile sun visor system, rather than the traditional sun visors, the additional center supports and variety of fasteners, all of which are installed overhead on a moving assembly line. Second, the tolerance stack-up problems between the traditional center support and the primary sun visor assembly are significantly reduced by the integration achieved through this invention; this causes a more pleasing aesthetic appearance due to improved fit and finish of the parts. Also, the efforts between the primary sun visor roller and the center support will also be more consistent.

While a number of specific embodiments of this sun visor system have been disclosed, it will be appreciated that various modifications may be made without departing from the present invention. For example, while the recessed tray has been described as being made of a polymeric material, it will be appreciated that it may be stamped from sheet metal without departing from the invention. Furthermore, while two lamps have been described on either side of the auxiliary sun visor, it will also be appreciated that a very thin single lamp centrally positioned behind the front header would also be covered by this invention. Also, the present invention would apply to a sun visor system where the primary sun visor elbow is attached to a sheet metal member other than the front header panel. It is intended by the following claims to cover these and any other departures from these disclosed embodiments which fall within the true spirit of this invention.

The invention claimed is:

1. A sun visor system for an automotive vehicle comprising:
   a primary sun visor having a vanity mirror,
   a primary sun visor elbow rotatably attached to said primary sun visor near an outboard end thereof,
   a center support for retaining said primary sun visor near an inboard end thereof when said primary sun visor is in a stowed position and a forward position,
   an auxiliary sun visor,
   a pair of remote illumination means,
   a headliner having a substrate material and a covering material therebelow, whereas said headliner covers an automotive vehicle's inner roof,
   a recessed tray member relatively thinner than said headliner, said recessed tray member proximally disposed below an automotive vehicle's front header panel; and
   said recessed tray member being independent from said headliner and replacing said headliner beneath said automotive vehicle's front header panel, said auxiliary sun visor affixed to said recessed tray, said primary sun visor proximally located beneath both said recessed tray and said auxiliary sun visor, respectively, said recessed tray having said pair of illumination means attached to said recessed tray member and disposed on either lateral end of said auxiliary sun visor, said pair of illumination means located behind said automotive vehicle's front header panel, a portion of said sun visor elbow extending through an outboard bezel area of said recessed tray member.

2. A sun visor system for an automotive vehicle, said automotive vehicle having a roof with an inner surface thereof and a front header panel attached thereto, said automotive vehicle further having a headliner covering at least a portion of said inner surface of said roof, said sun visor system comprising:
   a primary sun visor;
   a primary sun visor elbow rotatably coupled with said primary sun visor;
   a tray defined by a pair of lateral surfaces with a central surface therebetween, said lateral and central surfaces being substantially horizontal, a pair of substantially vertical walls connecting said central surface to each adjacent one of said pair of lateral surfaces adjacent thereto, said central surface juxtapositioned substantially against said front header panel with said headliner being clear therebetween, said pair of lateral surfaces vertically offset lower than said central surface;
   a center support extending from one of said pair of lateral surfaces, said center support detachably retaining said primary sun visor thereto; and
   said primary sun visor juxtapositioned against said tray when in a stowed position thereof.

3. The sun visor system of claim 2 further comprising:
   a vanity mirror mounted upon said primary sun visor; and
   a pair of illumination sources each disposed within a corresponding one of said pair of lateral surfaces of said tray, said pair of illumination sources illuminating a face of a vehicle occupant during viewing in said vanity mirror.

4. The sun visor system of claim 3 further comprising:

an electrical switch electrically actuating said pair of illumination sources.

5. The sun visor system of claim 4 wherein:

upon opening a lid covering said vanity mirror said electrical switch is closed thereby allowing electrical current to flow through an electrical circuit to actuate said pair of illumination sources.

6. The sun visor system of claim 3 wherein each of said pair of illumination sources includes:

a light bulb;

a plurality of light bulb terminals for retaining said light bulb to said tray, said plurality of light bulb terminals electrically coupling said light bulb to said electrical circuit;

a lens for directing light toward said face of said occupant, said lens attached to a corresponding one of said pair of lateral surfaces of said tray.

7. The sun visor system of claim 3 wherein:

said pair of illumination sources are disposed longitudinally behind said front header panel.

8. The sun visor system of claim 2 further comprising:

an auxiliary sun visor pivotably mounted to said tray and juxtapositioned against said central surface thereof when stowed, said auxiliary sun visor laterally juxtapositioned between said pair of lateral surfaces of said tray when stowed.

9. The sun visor system of claim 8 further comprising:

a rod pivotably connecting said auxiliary sun visor with said tray thereto; and a frictional control member mounted to said tray thereupon, said frictional control member controlling rotation of said rod and said auxiliary sun visor coupled thereto.

10. The sun visor system of claim 8 further comprising:

an extender slidably coupled to said auxiliary sun visor for coplanar movement therewith.

11. The sun visor system of claim 2 wherein:

said primary sun visor elbow extends through one of said pair of said lateral surfaces of said tray, said primary sun visor elbow further being fastened to said front header panel thereagainst, said primary sun visor pivoting from a stowed position to a functional position around said primary sun visor elbow and rotating in concert with said primary sun visor elbow from a forward position adjacent to a windshield to a side position adjacent to a side window thereagainst.

12. The sun visor system of claim 11 further comprising:

a quick connect fastener attaching said primary sun visor elbow to said front header panel thereagainst.

13. The sun visor system of claim 2 further comprising:

a pair of snap legs extending from said tray proximate with said center support thereby attaching said tray to said front header panel thereagainst.

14. The sun visor system of claim 13 further comprising:

a mandrel disengagably inserted between said pair of snap legs for maintaining said pair of snap legs in engagement with said front header panel.

15. A sun visor system for an automotive vehicle, said automotive vehicle having a roof with an inner surface thereof and a front header panel attached thereto, said sun visor system comprising:

a tray defined by a pair of lateral surfaces with a central surface therebetween, said lateral and central surfaces being substantially horizontal, a pair of substantially vertical walls connecting said pair of lateral surfaces vertically offset lower than said central surface;

a primary sun visor juxtapositioned against said tray when in a stowed position thereof;

a vanity mirror mounted upon said primary sun visor;

a center support extending from one of said pair of lateral surfaces, said center support detachably retaining said primary sun visor thereto;

a pair of illumination sources each disposed within a corresponding one of said pair of lateral surfaces of said tray, said pair of illumination sources illuminating a face of a vehicle occupant during viewing in said vanity mirror; and an auxiliary sun visor pivotably mounted to said tray and juxtapositioned against said central surface thereof when stowed, said auxiliary sun visor laterally juxtapositioned between said pair of lateral surfaces of said tray when stowed.

16. A sun visor system for an automotive vehicle, said automotive vehicle having a roof with an inner surface thereof and a front header panel attached thereto, said automotive vehicle further having a headliner covering at least a portion of said inner surface of said roof, said sun visor system comprising:

a primary sun visor;

a primary sun visor elbow rotatably coupled with said primary sun visor;

a tray defined by a pair of lateral surfaces with a central surface therebetween, said lateral and central surfaces being substantially horizontal, a pair of substantially vertical walls connecting said central surface to each adjacent one of said pair of lateral surfaces adjacent thereto, said central surface juxtapositioned substantially against said front header panel with said headliner being clear therebetween, said pair of lateral surfaces vertically offset lower than said central surface;

a center support extending from one of said pair of lateral surfaces, said center support detachably retaining said primary sun visor thereto;

said primary sun visor juxtapositioned against said tray when in a stowed position thereof;

a vanity mirror selectively covered by a lid mounted upon said primary sun visor;

a pair of illumination sources each disposed within a corresponding one of said pair of lateral surfaces of said tray, said pair of illumination sources disposed longitudinally behind said front header panel, said pair of illumination sources illuminating a face of a vehicle occupant during viewing in said vanity mirror, each of said pair of illumination sources including a light bulb, a plurality of light bulb terminals and a lens, said plurality of light bulb terminals retaining said light bulb to said tray, said plurality of light bulb terminals electrically coupling said light bulb to said electrical circuit, said lens directing light toward said face of said occupant, said lens attached to a corresponding one of said pair of lateral surfaces of said tray;

an electrical switch is closed upon opening said lid covering said vanity mirror thereby allowing electrical current to flow through an electrical circuit to actuate said pair of illumination sources;

an auxiliary sun visor pivotably mounted to said tray and juxtapositioned against said central surface thereof when stowed, said auxiliary sun visor laterally juxtapositioned between said pair of lateral surfaces of said tray when stowed; and said primary sun visor elbow extends through one of said pair of said lateral surfaces of said tray, said primary sun visor elbow further being fastened to said front header panel thereagainst, said primary sun visor pivoting from a stowed position to a functional position around said primary sun visor elbow and rotating in concert with said primary sun visor elbow from a forward position adjacent to a windshield to a side position adjacent to a side window thereagainst.

* * * * *